United States Patent [19]

Kawaguchi et al.

[11] Patent Number: 4,563,495

[45] Date of Patent: Jan. 7, 1986

[54] RESINOUS COMPOSITION FOR SLIDING MEMBERS

[75] Inventors: Akiyoshi Kawaguchi, Tokushima; Morihiko Nakamura, Naruto, both of Japan

[73] Assignee: Otsuka Chemical Co., Ltd., Osaka, Japan

[21] Appl. No.: 666,468

[22] Filed: Oct. 30, 1984

[30] Foreign Application Priority Data

Oct. 31, 1983 [JP] Japan ................. 58-204266

[51] Int. Cl.$^4$ .......................... C08K 3/22; C08K 3/10
[52] U.S. Cl. ................................ 524/413; 524/514
[58] Field of Search ............................. 524/413, 514

[56] References Cited

U.S. PATENT DOCUMENTS

| 3,129,105 | 4/1964 | Berry et al. | 524/413 |
| 3,980,570 | 9/1976 | Okuda et al. | 264/284 |
| 4,009,043 | 2/1977 | Preis | 524/413 |
| 4,442,254 | 4/1984 | Aratani | 524/413 |

FOREIGN PATENT DOCUMENTS 58-213032 12/1983 Japan ................. 524/413

*Primary Examiner*—Lewis T. Jacobs
*Attorney, Agent, or Firm*—Stiefel, Gross, Kurland & Pavane

[57] ABSTRACT

A resinous composition for sliding members such as bushings, bearings, sleeves, guiderails, sealant, switching parts, gears, cams or the like can be obtained by composing a polyamide resin, powdered high density polyethylene and potassium titanate whiskers. An appropriate composition is consisted essentially of 5–25% by weight of powdered high density polyethylene having below 200 μm in the particle size and more than 50000 of its molecular weight, 10–40% by weight of potassium titanate whiskers and remaining polyamide resin.

The sliding members molded by this composition has excellent mechanical strength, low abrasion and friction, high limiting PV value and high heat deforming temperature.

7 Claims, 1 Drawing Figure

RESINOUS COMPOSITION FOR SLIDING MEMBERS

BACKGROUND OF THE INVENTION

1. Field of the Invention

This invention relates to a resinous composition for sliding members having good frictional and abrasion-resistance properties, and more specifically it provides a resinous composition of polyamide resin which can produce sliding members having high limiting PV value and low coefficient of kineteic friction, and being small in abrasion loss per se as well as of adverse (or opposed) members and further being excellent in rigidity.

2. Description of the Prior Art

Polyamide resin has many excellent properties required for engineering plastics such as toughness, heat-resistance, chemical resistance, etc., although it has some defects such as a loss in mechanical strength, and dimensional stability when moisture is absorbed. Furthermore, this resin is better in self-lubricity than other engineering plastics. From these merits, this resin is useful for parts of bearings, gears and other parts of many kinds of machines which require abrasion-resistance and as a metal substitute because such parts constructed by this resin can be used without lubricant and generate low noise under sliding.

Recently, the fields of use of plastic sliding members is expanding to bearings under large loading without lubricant, bushs at high atmospheric temperature and several sliding parts having thin wall derived from minizing of the machines and their members or parts. Under such situation, the properties required for plastic sliding members become severe.

Generally speaking, plastic materials are good in self-lubricity, but are low in limiting PV value and worse in mechanical strength such as rigidity, when compared with metalic materials. Besides, the term "limiting PV value" can be called as "limit of PV" or "PV limit", in which P is loading pressure and V is peripheral velocity. In other words, a limiting PV value means a minimum value of P x V where a sliding member rotating at a peripheral velocity and loading pressure is melted or seizured by heat.

In general, in order to use plastic materials for sliding members such as bearings, the materials are desired to be not only low in coefficient of kineteic friction, high in limiting PV value, low in abrasion loss, good in frictional characteristics such as less damage for adverse materials, but also be superior in the rigidity and creep-resistance.

Along this line, several plans for improving mechanical properties and thermal deforming temperature of polyamide resin without influencing its friction and abrasion characteristics or rather improving such characteristics have heretofore been proposed. These proposals are, for example, to combine glass fibers and PTFE or carbon fibers and molybdenum dioxide with polyamide resin. However, these known techniques have the following defects.

Namely, in a bearing made from polyamide resin combined with glass fibers and PTFE, the glass fibers are microscopically exposed as it is used so as to "bite off" the adverse members (such as rotating shaft). Indeed, this "bite off" is a great drawback of this type bearing, and the abrasion loss and the friction coefficient become greater.

On the other hand, another bearing made from polyamide resin combined with carbon fibers and molybdenum disulfide is very expensive because of high cost of carbon fibers or molybdenum disulfide per se. Such bearing also suffers from the afore-mentioned "bite off".

Furthermore, common to the above known bearing materials, the lengths of the glass or carbon fibers are so long as about 3 mm that the molded products have large anisotropy so as to trouble the designation of the molds and moreover to lower the dimensional accuracy of the molded product after annealing.

As the result of the study for improving the defects such as "bite off" and anisotropy in molding by comparing long and hard fibers of glass or carbon in the combination with polyamide resin, the inventors have investigated the use of potassium titanate whiskers (hereinafter called as 'PTW') which are finer fibers than the glass or carbon fibers. At first, the investigation was directed to the combination of the whiskers with polyamide resin. Although this two components composition has improved on the limiting PV value and mechanical properties, the specific abrasion and abrasion resistance became worse all the more. These two characteristics are essential properties for material aimed for sliding members.

Unexpectedly, it has been found that the addition of powdered high-density polyethylene (hereinafter called as 'HDPE') to the above two components composition bring about remarkable improvement on mechanical characteristics, thermal resistance (deforming temperature of the molded product), shrinkages after the molding and further, coefficient of kineteic friction and abrasion loss were lowered as the amount of PTW was increased.

SUMMARY OF THE INVENTION

The present invention provides a resinous composition for sliding members which comprises a polyamide resin, a powdered high-density polyethylene and potassium titanate whiskers.

In the composition, the powdered polyethylene and the potassium titanate whiskers are preferred to contain in the range of 5-25% by weight and 10-40% by weight respectively, the remaining being balanced with the polyamide resin.

Figure 1:
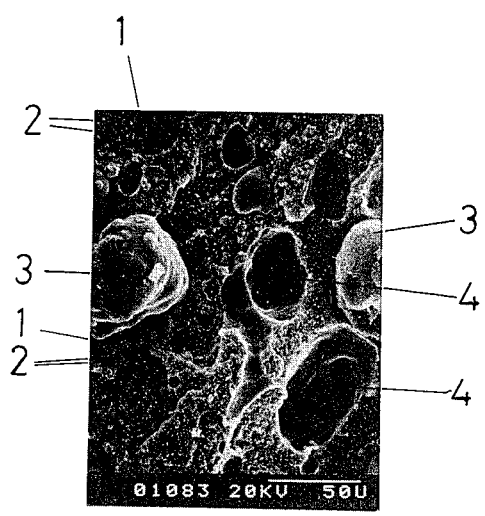
FIG. 1 is a sketch of a field of a scanning electron microscope in which a section of a part of the molded product by the invented composition (according to Example 2) is shown at 500 folds. The numerals in the drawing have the following meanings.

1: base material, 2: PTW, 3: HDPE, 4: void

DESCRIPTION OF THE PREFERRED EMBODIMENT

Examples of the polyamide resins employed in the invention are nylon 6, nylon 66, nylon 612, nylon 11, nylon 12, nylon MXD6 which is a xilidine-diamine type polyamide or copolymers of the monomers thereof, or the blend of the formers, among which nylon 66 is most practical from the viewpoints of the balanced characteristics to be realized and economy.

HDPE is a fine white powder which can be obtained by polymerization of ethylene using a medium pressure process (under 30-100 atms.) or low pressure process (atomospheric pressure at below 100° C.). Several stabilizers for heat, weather etc. may be added to the powder. The above HDPE can be characterized by its high-density (over 0.930 g/cm$^3$), comparatively high hardness and superiority in mechanical strength and thermal resistance as compared with other polyethylenes.

In connection with the purpose of this invention, it is preferable to select fine HDPE having average diameter of below about 200 μm but without lower limit. The surface of the molded product made from the invented composition becomes dense, if fine HDPE having an average diameter of below about 200 μm is used. The molecular weight of HDPE is preferably over ca. 50000. Such HDPE apts to be not deformed by shearing stress through mixing and kneading processes for obtaining the molding compound and is well dispersed without causing lamination or film-formation, and further, it is held in the state of powder in the molded product whereby good sliding property is given.

The amount of HDPE in the invented composition is suitably 5–25% by weight (as the same in the below), preferably 10–20%. If the amount of HDPE is below 5%, the coefficient of kineteic friction and specific abrasion of the molded product are poorly improved and also limiting PV value thereof will not be increased. On the other side, if the above amount is over 25%, the mechanical strength of the molded product tends to lower.

The PTW of the present invention is single-crystal fibers (i.e., whiskers) made of a compound of the general formula:

$K_2O \cdot n(TiO_2)$ or $K_2O \cdot n(TiO_2) \cdot \frac{1}{2} H_2O$, wherein n is an integer of 2–8. Concrete examples of PTW are whiskers of potassium tetratitanate, potassium hexatitanate, potassium octatitanate or the like, or mixture thereof. These whiskers shall be an average diameter of fiber of below 2 μm, an average length of fiber of 5–200 μm and a ratio of the average diameter and the average length (hereinafter called as "aspect ratio") of over 10. (The average diameter or length of fiber is an average value observed with at least five fields of view and at least 10 fibers per each field by an scanning electron microscope. The aspect ratio is calculated from the obtained average values.) When the average diameter of fiber, the average length of fiber and the aspect ratio are apart from the above ranges, for example, below 10 of the aspect ratio, the reinforcing effect to the resin is small. Besides, fibers longer than 100 μm in the average length are difficult to produce and not commercially available at the present stage.

As PTW of the present invention, one can advantageously use a commercial product of TISMO (manufactured by Otsuka Chemical Co., Ltd., JAPAN), which is high-strength and single-crystal whiskers having 0.2–0.2 μm of the average diameter, 10–20 μm of the average length and 20–100 of the aspect ratio.

The amount of PTW in the composition is preferably in the range of 10–40% (by weight), form the viewpoints of reinforcing effects on the polyamide resin, such as improvements on rigidity, creep-resistance and thermal deformation temperature as well as limiting PV value. If PTW is less than 10%, a sufficient improvement of mechanical strength is not achieved. On the other hand, if it is more than 40%, any further improvement of mechanical strength due to an excess amount is not obtained and a difficulty is observed in case of pelletizing the resinous composition as a molding material.

The above mentioned PTW may be used without any surface treatment but is advantageously treated with a surface treating agent in order to improve an interfacial adhesive strength between PTW and the polyamide resin. Preferably, silane coupling agent such as epoxysilane, aminosilane or acrylsilane, or titanate coupling agent is used, by which physical properties of the molded products in dry or wet state can be improved.

Moreover, the composition of the present invention comprising the polyamide resin, HDPE and PTW may suitable contain additives which are conventionaly used in synthetic resins, for example, lubricants such as PTFE, $MoS_2$, graphite, silicone oil or the like, or inorganic or organic fine powdered fillers, pigments, lubricants for flow, fire retardants, antistats, antioxidants, thermal stabilizers or the like.

A sliding member, for example, may be prepared by using the resionus composition of the invention as follows.

Prescribed amounts of polyamide resin, HDPE and PTW are homogeneously mixed with an appropriate mixer such as a blender, the mixture is pelletized with an extruder, and then the pellets thus formed is subjected to an injection molding machine to form a desired shape of product.

As shown by the attached FIG. 1 (which is a sectional view of a part of the molded product by the invented composition at 500 folds), this molded product consists from base material [1], white needle-like PTW (seen to be fine particles) [2] and small granular HDPE [3] both scattered in all over the field. In this molded product, it is considered that scattered HDPE increases lubricity, and PTW brings reinforcing effect and increases limiting PV value, and a synergistic action of HDPE and PTW improves abrasion resistance. Thus, the molded product is believed to show that the abrasion resistance is improved, the abrasion of the adverse members or parts is also markedly lowered and limiting PV value is raised so as to adopt the molded product to severe use under high speed and large load.

The sliding members which can be prepared from this invented composition are, for example, bushings bearings, sleeves, slip-ring, guiderails, sealants, switching parts, gears, cams or the like. And because of unique characteristics of the invented composition, it can be expected to apply it for new metal substitute.

The present invention is further explained by the following examples but it should fully be noted that they are a way of illustration and not a way of limitation.

EXAMPLES

Examples 1–6 and Controls 1–4

2020U (nylon 66 by Ube Kosan Co., Ltd., JAPAN), Fine grained Milion (a HDPE by Mitsui Petrochemical Industry, Ltd., JAPAN); average particle diameter of 50 μm and average molecular weight of 3000,000), TIS-MO-D102 (PTW by Otsuka Chemical Co., Ltd.) and 03MA411 (glass fiber of average fiber length 3 mm by Asahi Fiber Glass Co., Ltd., JAPAN) were blended by a blender according to the recipes of TABLE 1 and pelletized through an extruder of 40 mm φ at 290° C. The pelletes thus obtained were dried and then subjected to injection molding under the conditions of injection temperature:280° C., molding temperature:80° C., injection pressure:400 kg/cm$^2$ and shot time:15 seconds so as to mold test pieces. The pieces thus obtained were then tested by ASTM D638 for the tensile strength, ASTM D790 for flexural strength, ASTM D790 for flexural modulus and by ASTM D648 (load 18.6 kg/cm²) for HDT. And the mold shrinkage factor was measured to the flow direction of the tensile test pieces. The data are shown en bloc. in Table 1.

Similarly, other test pieces of a cylindrical form of OD 25 mm and ID 20 mm were prepared in a similar way as above, to test limiting PV value, coefficient of kinetic friction, specific abrasion and specific abrasion of adverse members.

Friction and abrasion test was carried out by SUZUKI-model abrasion tester (from Toyo-Baldwin Co., Ltd. JAPAN) using cylindrical hard steel (S45C) as the adverse member, under the conditions of no addition of lubricant, friction velocity (V) 30 cm/second, loading pressure (P) 10 kg/cm². The operation was stopped when the friction length reached to 10 km and then the coefficient of friction and the amount of the abrasion per unit length (specific abrasions of the tested piece itself and of the adverse member) were calculated. The tester was operated at a constant friction velocity (V) of 30 cm/second for one hour under several different loading pressures (P) for measuring limiting PV value. Thus, when the friction surface of the test piece was visibly damaged, the PV value under such load was decided.

specific abrasion are decreased in proportion to the amount of PTW added.

On the other hand, from the comparison with Control 4 in which glass fibers were added, it is clear that the use of PTW instead of glass fibers much lowers the coefficient of kinetic friction and the specific abrasion per se or of the adverse members.

Examples 7-11 and Controls 5-9

Similar to Example 1, A1030BRL (nylon 6 by UNITICA Co., Ltd., JAPAN), Reny 6001 (nylon MXD6, by Mitsubishi Gas Chemical Co., Ltd., JAPAN), Daiamid L1901 (nylon 12, by DAICEL-Huels Co., Ltd., JAPAN), TISMO-D102 and Hi-Zex 5000 (HDPE of average particle size 30 μm, averaged molecular weight 70,000, by Mitsui Petrochemical Co., Ltds., JAPAN) were compounded as shown in TABLE 2, pelletized and then injected so as to give test pieces. The properties of these pieces are shown in the following Table 2.

TABLE 2

| | Ingredients (percent by weight) | | | | | | Characteristics | | | | | | |
|---|---|---|---|---|---|---|---|---|---|---|---|---|---|
| Example Nos. | Nylon 6 | Nylon MXD 6 | Nylon 66 | Nylon 12 | PTW | HDPE | Tensile strength (Kg/cm²) | Flexural strength (Kg/cm²) | Flexural modulus (Kg/cm²) | Shrinkage at molding (%) | Coefficient of kinetic friction | Specific abrasion (mm³/ Kg · Km) | Critical PV value (Kg/cm² · cm/sec) |
| 7 | 75 | — | — | — | 20 | 5 | 960 | 1450 | 54000 | 0.62 | 0.32 | 0.053 | 1050 |
| 8 | 70 | — | — | — | 20 | 10 | 910 | 1340 | 51300 | 0.67 | 0.28 | 0.017 | 1500 |
| 9 | 60 | — | — | — | 20 | 20 | 820 | 1210 | 45600 | 0.74 | 0.21 | 0.009 | 1650 |
| 10 | — | 54.5 | 5.5 | — | 30 | 10 | 1260 | 1930 | 109000 | 0.18 | 0.24 | 0.015 | 2100 |
| 11 | — | — | — | 60 | 30 | 10 | 720 | 1150 | 48000 | 0.38 | 0.19 | 0.012 | 1800 |
| Control 5 | 100 | — | — | — | — | — | 800 | 980 | 28000 | 2.22 | 0.65 | 0.184 | 180 |
| Control 6 | 80 | — | — | — | 20 | — | 1030 | 1610 | 57000 | 0.73 | 0.67 | 0.273 | 450 |
| Control 7 | — | 90 | 10 | — | — | — | 845 | 1620 | 46000 | 1.41 | 0.53 | 0.257 | 270 |
| Control 8 | — | 54 | 6 | — | 30 | — | 1480 | 2270 | 121000 | 0.15 | 0.53 | 0.839 | 570 |
| Control 9 | — | — | — | 100 | — | — | 450 | 630 | 16100 | 1.55 | 0.52 | 0.121 | 150 |

As clear from the above Table 2, the test pieces made from the invented compositions consisting of nylon 6 and 5-20% (by weight)of HDPE and 20%(by weight)of PTW to the composition, respectively, have not only better mechanical properties and dimensional accuracy than that of nylon 6 only, but also have much improved coefficient of kinetic friction, specific abrasion and further limiting PV value. Alternatively, although the composition consisting of nylon 6 and PTW is much superior in the mechanical properties and dimensional accuracy, the improvement in the sliding characteristics is poor. Therefore, it seems not to be suitable as the composition for sliding members.

TABLE 1

| | Ingredients (percent by weight) | | | | Characteristics | | | | | | | |
|---|---|---|---|---|---|---|---|---|---|---|---|---|
| Example Nos. | Nylon 66 | PTW | HDPE | Glass fiber | Tensile strength (Kg/cm²) | Flexural strength (Kg/cm²) | Flexural modulus (Kg/cm²) | HDT (°C.) | Shrinkage at molding | Coefficient of kinetic friction | Specific abrasion (mm³/ Kg · Km) | Specific abrasion (adverse member) | Critical PV value (Kg/cm² · cm/sec) |
| 1 | 76 | 10 | 14 | — | 730 | 1120 | 40000 | 130 | 1.2 | 0.28 | 0.014 | 0 | 1800 |
| 2 | 66 | 20 | 14 | — | 900 | 1340 | 55000 | 222 | 0.71 | 0.27 | 0.01 | 0 | 2100 |
| 3 | 56 | 30 | 14 | — | 1140 | 1620 | 83000 | 234 | 0.51 | 0.19 | 0.008 | 0 | 2400 |
| 4 | 46 | 40 | 14 | — | 1330 | 1950 | 110000 | 237 | 0.39 | 0.17 | 0.008 | 0 | 2550 |
| 5 | 72 | 20 | 8 | — | 1080 | 1670 | 64000 | 226 | 0.62 | 0.28 | 0.012 | 0 | 1950 |
| 6 | 57 | 20 | 23 | — | 810 | 1260 | 50000 | 204 | 0.78 | 0.21 | 0.016 | 0 | 2200 |
| Control 1 | 100 | — | — | — | 840 | 1210 | 31000 | 85 | 2.2 | 0.61 | 0.049 | 0 | 240 |
| Control 2 | 70 | 30 | — | — | 1420 | 2320 | 96000 | 234 | 0.39 | 0.64 | 0.20 | $5.0 \times 10^{-5}$ | 630 |
| Control 3 | 80 | — | 20 | — | 570 | 920 | 24000 | 83 | 2.2 | 0.30 | 0.02 | 0 | 750 |
| Control 4 | 56 | — | 14 | 30 | 1360 | 1920 | 72000 | 237 | 0.30 | 0.69 | 0.36 | $6.6 \times 10^{-3}$ | 1350 |

As seen from Table 1, it is clear that the test pieces made from the invented compositions have much lower coefficient of kinetic friction and specific abrasion per se or of the adverse members than those of the controls consisting of nylon 66 solely (Control 1) or nylon 66 and PTW (Control 2), due to the addition of HDPE. Similarly, it is further clear that the formers have much increased tensile strength, flexural strength, flexural modulus, HDT and limiting PV value, and moreover have decreased shrinkage at molding as compared with that of the control consisting of nylon 66 and HDPE (Control 3), and that coefficient of kinetic friction and The same tendency can be seen in the compositions using nylon MXD6 and nylon 12. Thus, it may be summarized that any of polyamide resins is useful to give an excellent molding composition for sliding members when it is compounded with HDPE and PTW, in particular, in the ranges of 5–25 % of HDPE and 10–40 % of PTW.

What we claim is:

1. A resinous composition for sliding members which comprises a polyamide resin, a powdered high density polyethylene in an amount of 5 to 25% by weight of the composition and potassium titanate whiskers in an amount of 10 to 40% by weight of the composition.

2. A resinous composition for sliding members according to claim 1, wherein an average particle size and average molecular weight of the powdered high density polyethylene are not larger than 200 μm and not smaller than 50000, respectively.

3. A resinous composition for sliding members according to claim 1, wherein the potassium titanate whiskers are made of a compound of the formula:

$$K_2O \cdot n(TiO_2) \text{ or } K_2O \cdot n(TiO_2) \cdot \tfrac{1}{2} H_2O$$

in which n is an integer of 2–8.

4. A resious composition for sliding members according to claim 1, wherein the potassium titanate whiskers have a aspect ratio of over 10.

5. A resinous composition for sliding members according to claim 1, wherein the polyamide resin is nylon 66.

6. The composition of claim 3 wherein the potassium titanate whiskers are potassium tetratitanate, potassium hexatitanate or potassium octatitanate.

7. A sliding member which is molded by the use of a resinous compositions as claimed in any one of claims 1, 2, 3, 4, 5 or 6.